US012651540B2

(12) United States Patent
Koo

(10) Patent No.: US 12,651,540 B2
(45) Date of Patent: Jun. 9, 2026

(54) IMAGE DISPLAY APPARATUS HAVING FLEXIBLE DISPLAY

(71) Applicant: LG ELECTRONICS INC., Seoul (KR)

(72) Inventor: Junbeom Koo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 18/841,315

(22) PCT Filed: Mar. 10, 2022

(86) PCT No.: PCT/KR2022/003387
§ 371 (c)(1),
(2) Date: Aug. 23, 2024

(87) PCT Pub. No.: WO2023/171834
PCT Pub. Date: Sep. 14, 2023

(65) Prior Publication Data
US 2025/0166530 A1 May 22, 2025

(51) Int. Cl.
G06F 1/16 (2006.01)
G06F 3/01 (2006.01)
G09F 9/30 (2006.01)

(52) U.S. Cl.
CPC ............ G09F 9/301 (2013.01); G06F 1/1652 (2013.01); G06F 3/016 (2013.01)

(58) Field of Classification Search
CPC ................................ G06F 3/016; G06F 1/1652
See application file for complete search history.

(56) References Cited

U.S. PATENT DOCUMENTS

| | | | |
|---|---|---|---|
| 6,272,857 B1 * | 8/2001 | Varma | F03G 7/0615 60/527 |
| 7,808,550 B2 * | 10/2010 | Misawa | H04N 23/531 348/333.01 |
| 8,380,327 B2 * | 2/2013 | Park | G06F 1/1624 361/679.01 |
| 8,654,177 B2 * | 2/2014 | Kim | H04N 23/51 348/335 |

(Continued)

FOREIGN PATENT DOCUMENTS

| | | |
|---|---|---|
| JP | 2003-280246 A | 10/2003 |
| JP | 2019-124740 A | 7/2019 |

(Continued)

*Primary Examiner* — Adrian S Wilson
(74) *Attorney, Agent, or Firm* — Birch, Stewart, Kolasch & Birch, LLP

(57) ABSTRACT

The present invention relates to an image display apparatus having a flexible display configured to be conveniently bent even when a user does not directly apply external pressure thereto, and may provide an image display apparatus comprising: a flexible display panel; an actuator mounted on the rear surface of the flexible display panel so as to bend at least a portion of the flexible display, and comprising a first shape memory alloy and a second shape memory alloy; a current supplier for individually supplying current to the first shape memory alloy and the second shape memory alloy; and a control unit for controlling an operation of the current supplier.

9 Claims, 10 Drawing Sheets

(56) References Cited

U.S. PATENT DOCUMENTS

| | | | | |
|---|---|---|---|---|
| 8,730,657 B2* | 5/2014 | Ramrattan | ............ | H05K 1/148 |
| | | | | 361/679.21 |
| 8,787,016 B2* | 7/2014 | Rothkopf | ............ | H05K 5/0226 |
| | | | | 361/679.55 |
| 9,744,055 B2* | 8/2017 | Engeberg | ............ | F03G 7/0614 |
| 2005/0160858 A1* | 7/2005 | Mernoe | ............. | F03G 7/06143 |
| | | | | 74/469 |
| 2005/0285963 A1* | 12/2005 | Misawa | ............. | H04N 23/651 |
| | | | | 348/E5.025 |
| 2006/0038745 A1* | 2/2006 | Naksen | ............... | G06F 1/1624 |
| | | | | 257/40 |
| 2008/0198541 A1* | 8/2008 | Lin | ...................... | G06F 1/1615 |
| | | | | 361/679.05 |
| 2008/0303782 A1* | 12/2008 | Grant | ..................... | G06F 3/016 |
| | | | | 345/173 |
| 2009/0002328 A1* | 1/2009 | Ullrich | ............... | G09B 21/004 |
| | | | | 345/173 |
| 2010/0007714 A1* | 1/2010 | Kim | ...................... | H04N 23/51 |
| | | | | 156/247 |
| 2011/0188189 A1* | 8/2011 | Park | .................... | H04M 1/0268 |
| | | | | 361/679.05 |
| 2011/0241998 A1* | 10/2011 | Mckinney | ........... | H04M 1/0247 |
| | | | | 345/204 |
| 2012/0327048 A1* | 12/2012 | Ramrattan | ......... | H04M 1/0268 |
| | | | | 345/204 |
| 2014/0003006 A1* | 1/2014 | Ahn | ...................... | G06F 1/1679 |
| | | | | 361/749 |
| 2014/0098075 A1* | 4/2014 | Kwak | ................. | G09G 3/2003 |
| | | | | 345/204 |
| 2014/0098095 A1* | 4/2014 | Lee | ...................... | G06F 3/04815 |
| | | | | 345/420 |
| 2014/0226275 A1* | 8/2014 | Ko | ........................ | G06F 1/1601 |
| | | | | 361/679.27 |
| 2014/0307395 A1* | 10/2014 | An | ........................ | G06F 1/1652 |
| | | | | 361/749 |
| 2014/0320393 A1* | 10/2014 | Modarres | ............. | G06F 1/1641 |
| | | | | 345/156 |
| 2014/0354791 A1* | 12/2014 | Lee | ........................ | G06F 3/165 |
| | | | | 348/739 |
| 2015/0002643 A1* | 1/2015 | Jung | ..................... | G02B 30/54 |
| | | | | 348/51 |
| 2015/0289994 A1* | 10/2015 | Engeberg | ............. | F03G 7/0614 |
| | | | | 60/527 |
| 2017/0215272 A1* | 7/2017 | Kyung | ................... | G09F 9/301 |
| 2022/0019271 A1* | 1/2022 | Kim | ....................... | G06F 1/181 |

FOREIGN PATENT DOCUMENTS

| | | | |
|---|---|---|---|
| KR | 10-135301 | B1 | 1/2014 |
| KR | 10-2015-0132038 | A | 11/2015 |
| KR | 10-2016-0078056 | A | 7/2016 |
| KR | 10-2017-0027162 | A | 3/2017 |
| KR | 10-2021-0037408 | A | 4/2021 |

* cited by examiner

Start (2-1)

(2-2)

(2-3)

(5-1)  (5-2)

(7-1)

(7-2)

| Current supply | ON | OFF |
|---|---|---|
| First SMA (441) | Flat | Curved |
| Second SMA (442) | Curved | Flat |

(10-1)

(10-2)

(11-1)

(11-2)

(12-1)                                    (12-2)

(13-1)                                    (13-2)

(14-1)                         (14-2)

IMAGE DISPLAY APPARATUS HAVING FLEXIBLE DISPLAY

CROSS REFERENCE TO RELATED APPLICATION

This application is the National Phase of PCT International Application No. PCT/KR2022/003387, filed on Mar. 10, 2022, the contents of which is hereby expressly incorporated by reference into the present application.

TECHNICAL FIELD

The present disclosure relates to an image display device having a flexible display that allows the use of the image display device to be implemented in further consideration of user convenience.

BACKGROUND ART

An image display device includes, for example, a function for receiving and processing a broadcast image viewable by a user. The image display device displays a broadcast, which is selected by the user from among broadcast signals transmitted from a broadcast station, on a display. Currently broadcasters are transitioning from analog to digital broadcasting.

Digital broadcasting refers to broadcasting of digital video and audio signals. The digital broadcast has low data loss due to robustness against external noise, error correction, high resolution and a high-definition screen, as compared with an analog broadcast. In addition, digital broadcasting can provide a bidirectional service unlike analog broadcasting.

Existing flat panel display panels have limitations in their application and use because they use glass substrates that are not flexible. However, in recent years, flexible display panels, i.e., bendable display panels have been introduced. Therefore, in order for an image display device having the flexible display to be bendable in some cases, a body of the image display device may be configured such that its appearance may be deformed.

In the case of an image display device such as a smartphone with a flexible display, a size of the image display device is small. Therefore, even if the image display device is configured to be folded or bent by a user who manually applies an external force to the image display device in direct, there may be no significant inconvenience to the user.

However, in the case of an image display device such as a TV with a flexible display, a size thereof is large. Therefore, if the image display device is configured to be folded or bent by a user who manually applying an external force to the image display device, it may cause inconvenience to the user.

DISCLOSURE

Technical Tasks

The present disclosure is proposed to solve the above problems, and one technical task of the present disclosure is to provide an image display device having a flexible display that may be configured to bent conveniently even if a user does not directly apply an external force in case of the image display device having the same size as a TV having a flexible display.

Technical Solutions

In one technical aspect of the present disclosure, provided is an image display device including a flexible display panel, an actuator mounted on a rear surface of the flexible display panel to bend at least a portion of the flexible display panel and having a first shape memory alloy and a second shape memory alloy, a current supplier for individually supplying current to the first shape memory alloy and the second shape memory alloy, and a controller for controlling an operation of the current supplier.

The actuator may include a plurality of actuator modules sequentially fastened in a length direction.

A plurality of the actuator modules may include at least a first actuator module and a second actuator module and each of the first actuator module and the second actuator module may include a first fastening part at one end of the length direction and a second fastening part at the other end thereof.

A friction material may be interposed between the first fastening part and the second fastening part to provide a frictional force of a prescribed magnitude on rotation based on rotatably coupling the first fastening part of the first actuator module and the second fastening part of the second actuator module together.

The frictional force may be smaller than a restoring torque of the first shape memory alloy and the second shape memory alloy and greater than elasticity of the flexible display panel.

The first shape memory alloy and the second shape memory alloy may have a linear shape and a curved shape at a predetermined temperature or higher, respectively, and the first shape memory alloy and the second shape memory alloy may have a curved shape and a linear shape at a temperature below the predetermined temperature, respectively.

The first shape memory alloy may be disposed along a length direction of the actuator on one side in a thickness direction of the actuator and the second shape memory alloy may be disposed along the length direction of the actuator on the other side in the thickness direction of the actuator.

The actuator may be mounted on a lower or upper end portion of a rear surface of the flexible display panel in a vertical direction, the image display device may further include a stand for supporting the image display device on a ground or a ceiling holder for mounting the image display device on a ceiling, and the stand or the ceiling holder may include a sensor for measuring a length of the stand or the ceiling holder.

The controller may control to determine whether to bend the flexible display panel depending on the length of the stand or the ceiling holder.

The controller may control the flexible display panel to be bent when the length of the stand or the ceiling holder becomes equal to or smaller than a predetermined length.

The controller may control a curvature of the flexible display panel to be inversely proportional to the length of the stand or the ceiling holder.

Advantageous Effects

Effects of an image display device according to the present disclosure will be described as follows.

According to at least one of embodiments of the present disclosure, there is an advantage in that a curvature of a flexible display panel may be changed through an actuator including a shape memory alloy, so that the curvature of the flexible display panel may be automatically adjusted.

According to at least one of embodiments of the present disclosure, there is an advantage in that a desired curvature may be maintained even if a current is not supplied to a shape memory alloy after a curvature of a flexible display panel reaches the desired curvature, thereby helping to save power.

In addition, according to at least one of embodiments of the present disclosure, there is an advantage in that a curvature of a flexible display panel may be automatically determined depending on a height of the flexible display panel.

BEST MODE

Description will now be given in detail according to exemplary aspects disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well known to one of ordinary skill in the relevant art has generally been omitted for the sake of brevity. The accompanying drawings are used to help easily understand various technical features and it should be understood that the aspects presented herein are not limited by the accompanying drawings. As such, the present disclosure should be construed to extend to any alterations, equivalents and substitutes in addition to those which are particularly set out in the accompanying drawings.

The terms "module" and "unit" attached to describe the names of components are used herein to help the understanding of the components and thus should not be considered as having specific meanings or roles. Accordingly, the terms "module" and "unit" may be used interchangeably.

In addition, each of these components may be configured as a separate individual hardware module or implemented as two or more hardware modules. Two or more components may be implemented as a single hardware module, or in some cases, may be implemented as software.

Aspects of this disclosure will be described in detail with reference to the attached drawings, but it should be understood that they are merely illustrative of this disclosure and should not be interpreted as limiting the scope of this disclosure.

In addition, although the terms used in this disclosure are selected from generally known and used terms, some of the terms mentioned in the description of this disclosure, the detailed meanings of which are described in relevant parts of the description herein, have been selected at the discretion of the applicant. Furthermore, this disclosure must be understood, not simply by the actual terms used but by the meanings of each term lying within.

Figure 1:
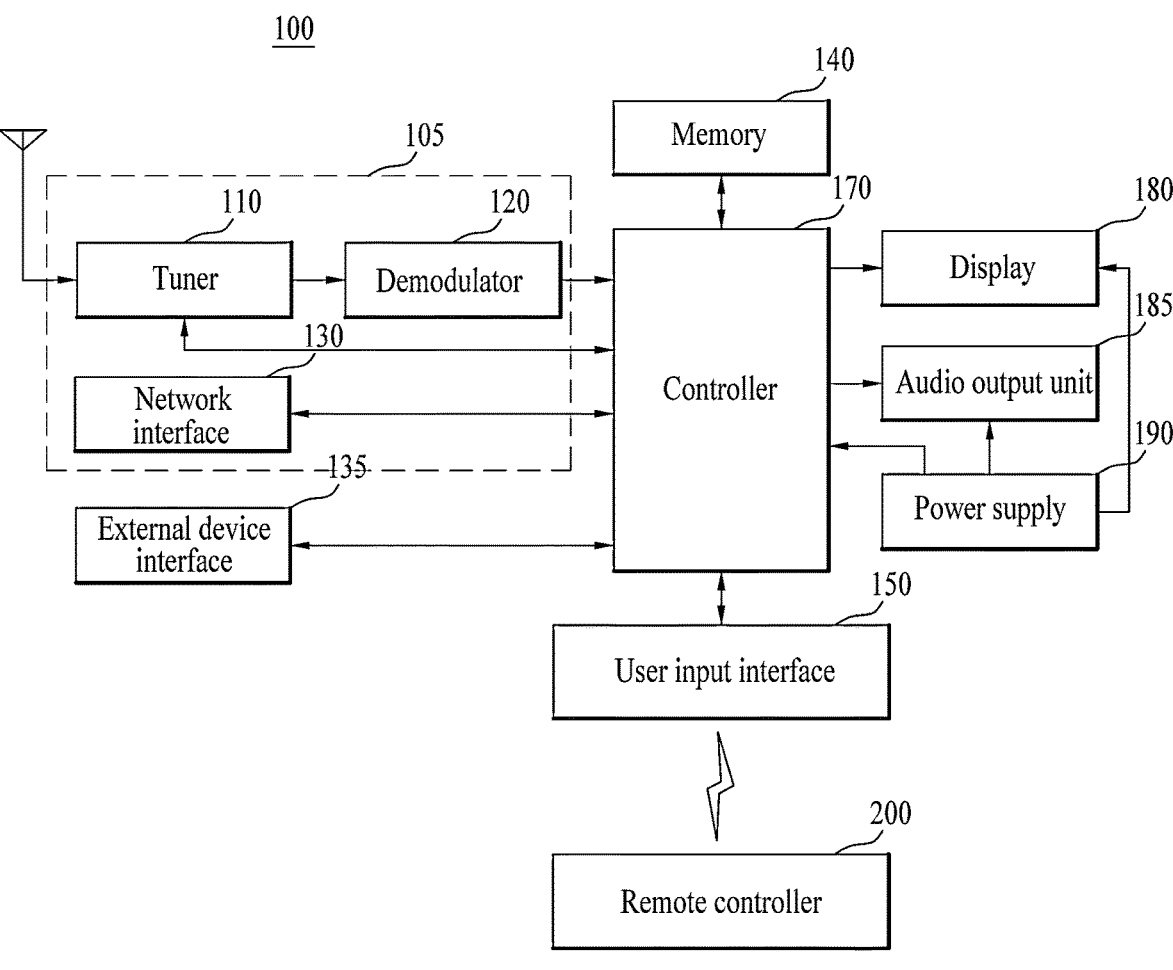
FIG. 1 is a schematic block diagram of an image display device according to one embodiment of the present disclosure.

FIG. 1 is a schematic block diagram of an image display device according to one embodiment of the present disclosure.

Referring to FIG. 1, an image display device 100 according to one aspect of this disclosure includes a broadcast receiver 105, an external device interface 135, a memory 140, a user input interface 150, a controller 170, a display 180, an audio output unit 185, a power supply 190, and a camera module (not shown).

The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal.

More specifically, if the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal Side-Band (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120) performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The TS output from the demodulator 120 may be input to the controller 170 and thus subjected to demultiplexing and A/V signal processing. The processed video and audio signals are output to the display 180 and the audio output unit 185, respectively.

The external device interface 135 may serve as an interface between an external device and the image display device 100. For interfacing, the external device interface 135 may include an A/V Input/Output (I/O) unit (not shown) and/or a wireless communication module (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 100.

The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards.

The external device interface 135 may be connected to various set-top boxes through at least one of the above-described ports and may thus perform an I/O operation with the various set-top boxes.

The external device interface 135 may receive applications or an application list from an adjacent external device and provide the applications or the application list to the controller 170 or the memory 140.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display device 100 to a user or electronic device selected from among users or electronic devices pre-registered with the image display device 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD, and broadcast signals, and information related to the content from a CP or an NP. Also, the network interface 130 may receive update information about firmware from the NP and update the firmware. The network interface 130 may transmit data over the Internet or to the CP or the NP.

The network interface 130 may selectively receive a desired application among open applications over a network.

In an aspect of this disclosure, when a game application is executed in the image display device, the network interface 130 may transmit data to or receive data from a user terminal connected to the image display device through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel storage function.

The memory 140 may store applications or a list of applications received from the external device interface 135 or the network interface 130.

In an aspect of this disclosure, when the image display device provides a game application, the memory 140 may store user-specific information and game play information of a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or extreme Digital (XD) memory), a Random Access Memory (RAM), or a Read-Only Memory (ROM) such as an Electrically Erasable and Programmable Read Only Memory (EEPROM). The image display device 100 may reproduce content stored in the memory 140 (e.g. video files, still image files, music files, text files, and application files) to the user.

While the memory 140 is shown in FIG. 1 as configured separately from the controller 170, to which this disclosure is not limited, the memory 140 may be incorporated into the controller 170, for example.

The user input interface 150 transmits a signal received from the user to the controller 170 or transmits a signal received from the controller 170 to the user.

For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication.

For example, the user input interface 150 may provide the controller 170 with control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be audibly output through the audio output unit 185. Also, the audio signal processed by the controller 170 may be transmitted to the external output device through the external device interface 135.

While not shown in FIG. 1, the controller 170 may include a DEMUX and a video processor, which will be described later with reference to FIG. 10.

In addition, the controller 170 may provide overall control to the image display device 100. For example, the controller 170 may control the tuner 110 to tune to an RF broadcast signal corresponding to a user-selected channel or a pre-stored channel.

The controller 170 may control the image display device 100 according to a user command received through the user input interface 150 or according to an internal program. Especially the controller 170 may access a network and download an application or application list selected by the user to the image display device 100 over the network.

For example, the controller 170) controls the tuner 110 to receive a signal of a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

As another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an externally input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display device 100, received broadcast content, and externally input content. The content includes at least one of a broadcast image, an externally input image, an audio file, a still image, a Web page, or a text file.

Upon receipt of a return-to-home screen input, the controller 170 may control display of the home screen on the display 180.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display device. The card objects may further include at least one of a card object representing a list of connected external devices or a card object representing a call-associated list.

The home screen may further include an application menu including at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The size of the broadcast image may be set to a fixed size.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of the display 180.

Upon receipt of an incoming call at a connected external device or the image display device 100, the controller 170 may control focusing-on or shift of a call-related card object among the plurality of card objects.

If an application view menu item is selected, the controller 170 may control display of applications or a list of applications that are present in the image display device 100 or downloadable from an external network.

The controller 170 may control installation and execution of an application downloaded from the external network along with various UIs. Also, the controller 170 may control display of an image related to the executed application on the display 180, upon user selection.

Although not shown, the image display device 100 may further include a channel browsing processor for generating thumbnail images corresponding to channel signals or externally input signals.

The channel browsing processor may receive the TS output from the demodulator 120 or the TS output from the external device interface 135, extract images of the received TS and generate thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touchscreen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display device 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The image display device 100 may further include the camera unit (not shown) for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display device 100.

Particularly, the power supply 190 may supply power to the controller 170 which may be implemented as a System On Chip (SOC), the display 180 for displaying an image, and the audio output unit 185 for audio output.

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, Ultra Wideband (UWB) and ZigBee.

In addition, the remote controller 200 may receive a video signal, an audio signal or a data signal from the user input interface 150 and output the received signals visually, audibly or as vibrations.

The above-described image display device 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display device 100 illustrated in FIG. 1 is purely exemplary. Depending upon the specifications of the image display device 100 in actual implementation, the components of the image display device 100 may be combined or omitted or new components may be added. That is, two or more components may be incorporated into one component or one component may be configured as separate components, as needed. In addition, the function of each block is described for the purpose of describing the aspect of this disclosure and thus specific operations or devices should not be construed as limiting the scope and spirit of this disclosure.

Unlike the configuration illustrated in FIG. 1, the image display device 100 may be configured so as to receive and play back video content through the network interface 130 or the external device interface 135, without the tuner 110 and the demodulator 120 shown in FIG. 1.

In some implementations, the image display device 100 may further include an ambient light sensor an illumination sensor (not shown) to sense an ambient light brightness.

Hereinafter, the following description will be made on the assumption that the display unit 180 is configured as a flexible display.

Figure 2:
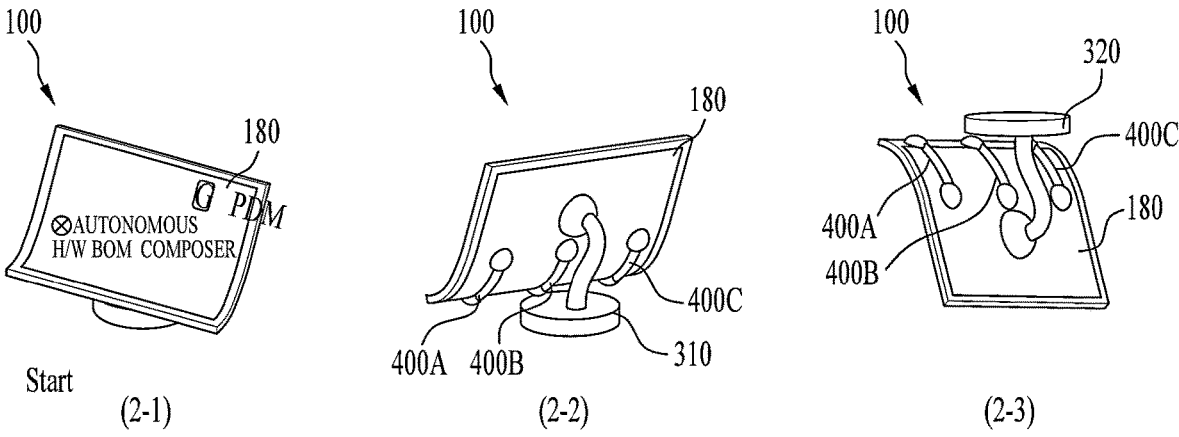
FIG. 2 is a diagram illustrating an image display device having at least one actuator for automatically bending the image display device according to an embodiment of the present disclosure.

The image display device 100 may include at least one actuator configured to automatically bend the image display device. This will be described further with reference to FIG. 2. FIG. 2 illustrates an image display device including at least one actuator configured to automatically bend the image display device according to an embodiment of the present disclosure.

As shown in FIG. 2 (2-1), the image display apparatus 100 may be configured to be at least partially bent when having the flexible display. In FIG. 2 (2-1), it is shown that a lower end portion of the image display apparatus 100 may be bent when being mounted or supported on a table or on floor (ground) through a stand 310.

To this end, as shown in FIG. 2 (2-2), the image display device 100 may include at least one actuator 400 for automatically bending the image display device 100 or the flexible display 180 at a lower end portion of a rear surface of the flexible display 180. FIG. 2 (2-2) exemplarily shows that three actuators 400A, 400B, and 400C are mounted on the lower end portion of the rear surface of the flexible display 180 in a vertical direction, i.e., in a direction vertical to the ground.

Meanwhile, regarding the image display device 100, as shown in FIG. 2 (2-3), the image display device 100 may be mounted on a ceiling through a ceiling holder 320. In this case, the image display device 100 may include at least one actuator 400 for automatically bending the image display device 100 or the flexible display 180 on an upper end portion of the rear surface of the flexible display 180. FIG. 2 (2-3) exemplarily shows that three actuators 400A. 400B, and 400C are mounted on the upper end portion of the rear surface of the flexible display 180 in an upward-downward direction, i.e., in a vertical direction with respect to the ground.

Figure 3:
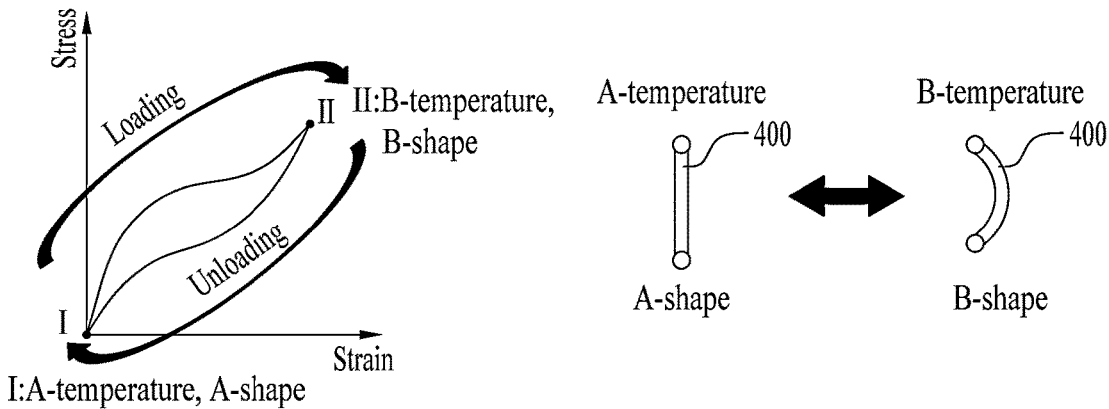
FIG. 3 is a diagram illustrating the characteristics of the shape memory alloy.

Hereinafter, shape switching of the actuator 400 will be described with reference to FIG. 3. FIG. 3 illustrates characteristics of a shape memory alloy.

The actuator 400 may be configured to include a Shape Memory Alloy (SMA).

The shape memory alloy refers to an alloy that memorizes a shape at a predetermined temperature or higher, and may be immediately restored to the memorized shape if it heats up to the predetermined temperature or higher no matter how severe the deformation is applied at a low temperature.

That is, the shape of the actuator 400 including the shape memory alloy may be switched between A-shape and B-shape in response to a change in temperature.

Figure 4:
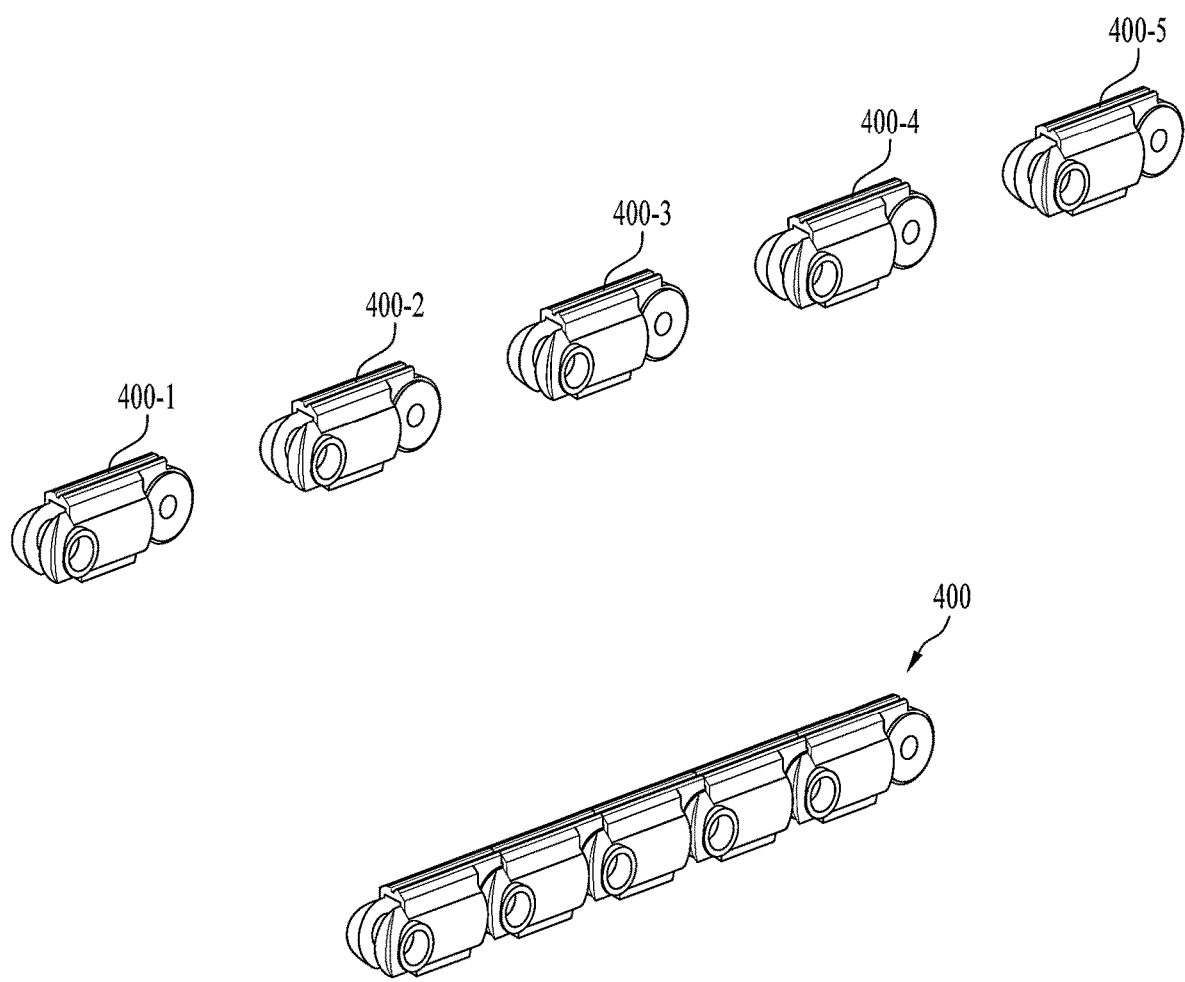
FIG. 4 is a diagram illustrating a structure of an actuator according to an embodiment of the present disclosure.

Hereinafter, the structure of the actuator 400 will be described with reference to FIG. 4. FIG. 4 illustrates a structure of an actuator according to an embodiment of the present disclosure.

As shown in FIG. 4, the actuator 400 may be configured by coupling a plurality of actuator blocks 400-1 to 400-5 together. The actuator 400 having a desired length may be configured by coupling a plurality of the actuator blocks together by the desired number.

Figure 5:
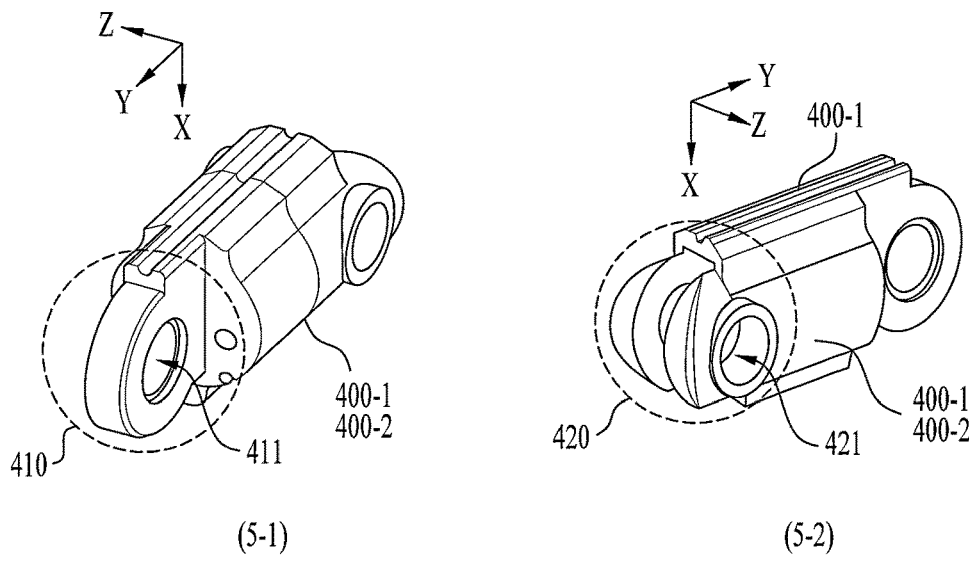
FIG. 5 is a perspective diagram illustrating an actuator block of FIG. 4.

Hereinafter, a shape of an individual actuator block will be described with reference to FIG. 5. FIG. 5 is a perspective view of the actuator block of FIG. 4. FIG. 5 (5-1) is a perspective diagram illustrating the actuator block viewed in one direction, and FIG. 5 (5-2) is a perspective diagram illustrating the actuator block viewed in a direction opposite to the one direction.

The actuator blocks 400-1 and 400-2 may include a first fastening part 410 at one end in the Y-direction and a second fastening part 420 at the other end in the Y-direction.

The first fastening part 410 may have a shape of a single circular donut parallel to an X-Y plane. That is, the first fastening part 410 may have an opening 411 in the Z direction.

The second fastening part 420 may have a shape of two circular donuts overlapped with each other at a predetermined interval in-between so as to be parallel to the X-Y plane. The second fastening part 420 may also have an opening 421 in the Z-direction.

Figure 6:
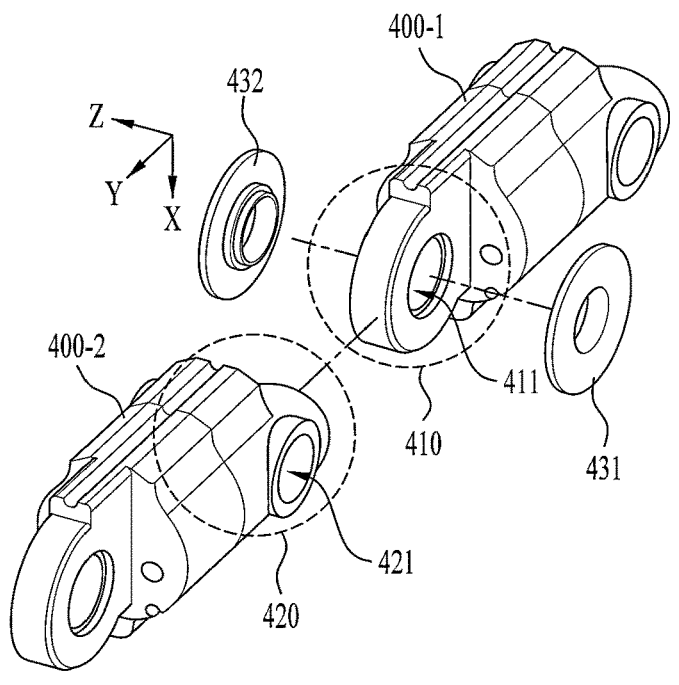
FIG. 6 is a diagram illustrating the coupling of two actuator blocks of FIG. 5.

Hereinafter, the coupling of two actuator blocks will be described with reference to FIG. 6. FIG. 6 illustrates the coupling of the two actuator blocks of FIG. 5.

When the two actuator blocks 400-1 and 400-2 are coupled in the Y-direction, the first fastening part 410 of the first actuator block 410-1 may be inserted into the second fastening part 420 of the second actuator block 410-2, and a rivet (not shown) may be inserted to pass through the opening 411 of the first body part 410 and the opening 421 of the second fastening part 420.

Therefore, after the coupling, the two actuator blocks 400-1 and 400-2 are not separated in the Y-direction but may rotate mutually in an X-Y plane direction.

In order to impart a frictional force to the mutual rotation, the first fastening part 410 of the first actuator block 410-1 may be inserted into the second fastening part 420 of the second actuator block 410-2 after a first washer 431 and a second washer 432 are attached to both surfaces thereof, respectively, and the rivet may be inserted to pass through the opening 411 of the first body part 410 and the opening 421 of the second fastening part 420. The first washer 431 and the second washer 432 are merely examples for imparting a frictional force, and other friction materials may be interposed therebetween.

The frictional force may be greater than the bending and/or restoring elasticity of the flexible display panel 180, and may be less than the torque for restoring a first shape memory alloy 441 and a second shape memory alloy 442 to the memorized shape when their temperatures rise above the predetermined temperature.

Therefore, as current is supplied to the first shape memory alloy 441 and/or the second shape memory alloy 442, the actuator 400 is restored to the memorized shape, and thus the flexible display panel 180 is bent to match the memorized shape. In doing so, although the current supply is interrupted, the frictional force may serve as a support force to maintain the bending of the flexible display panel 180.

Figure 7:
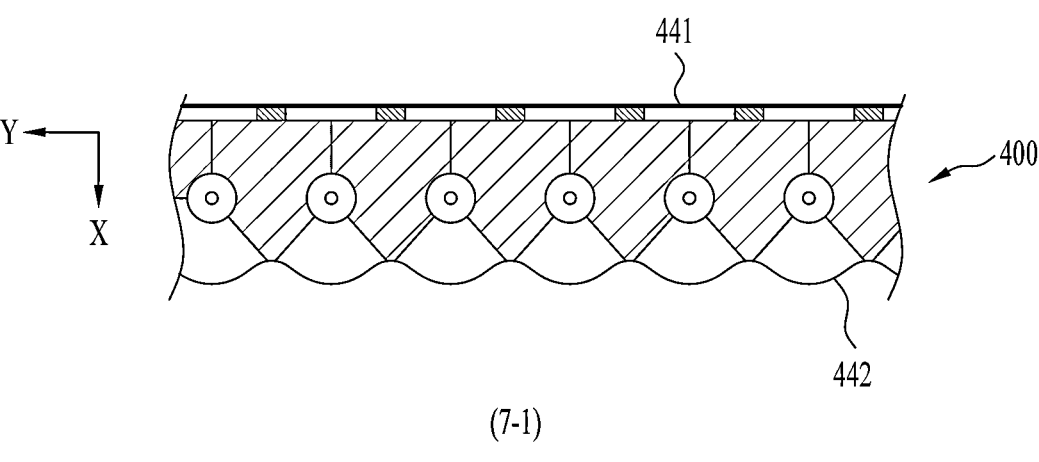
FIG. 7 is a diagram illustrating a disposition structure of a shape memory alloy in an actuator according to an embodiment of the present disclosure.
Figure 7:
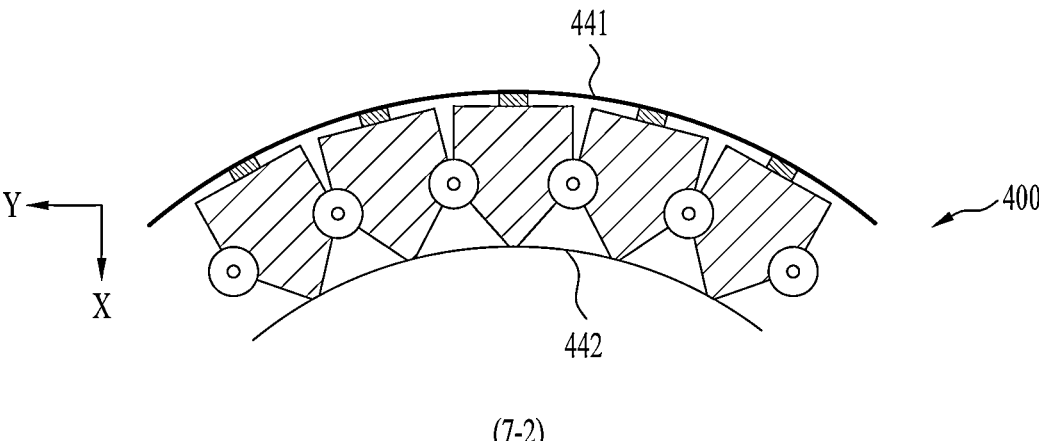

Hereinafter, a disposition structure of the Shape Memory Alloy (SMA) in the actuator will be described with reference to FIG. 7 and FIG. 8. FIG. 7 illustrates a disposition structure of the shape memory alloy in the actuator according to an embodiment of the present disclosure, and FIG. 8 illustrates shapes of the first shape memory alloy and the second shape memory alloy of FIG. 7 according to current supply on/off.

As illustrated in FIG. 7, the first shape memory alloy 441 in a wire shape may be disposed on one side of the X-direction (i.e., a thickness direction of the actuator 400) of the actuator 400 along the Y-direction (i.e., a length direction of the actuator 400), and the second shape memory alloy 442 in a wire shape may be disposed on the other side of the X-direction of the actuator 400 along the Y-direction.

Figures 8, 9:
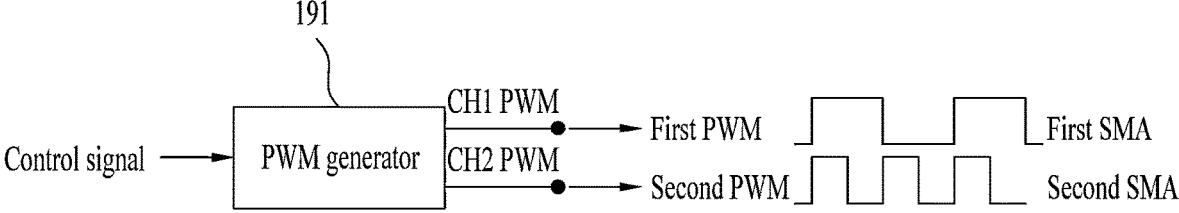
FIG. 8 is a diagram illustrating shapes of a first shape memory alloy and a second shape memory alloy of FIG. 7 according to current supply ON/OFF.
FIG. 9 is a block diagram illustrating a current supplier for supplying a current to an actuator according to an embodiment of the present disclosure.

As illustrated in FIG. 8, the first shape memory alloy 441 may have a linear shape when current is supplied and thus a prescribed temperature or higher is reached, and may have a curved shape when the current supply is stopped and thus a prescribed temperature or lower is reached. In addition, the second shape memory alloy 442 may have a curved shape when current is supplied and thus a prescribed temperature or higher is reached, or may have a linear shape when the current supply is stopped and thus a prescribed temperature or lower is reached.

Therefore, when current is supplied to the first shape memory alloy 441 without being supplied to the second shape memory alloy 442, as shown in FIG. 7 (7-1), the actuator 400 may be stretched to have a straight line shape.

On the other hand, when current is supplied to the second shape memory alloy 442 without being supplied to the first shape memory alloy 441, as shown in FIG. 7 (7-2), the actuator 400 may be bent to have a curved shape along the X-Y plane.

The first shape memory alloy 441 and the second shape memory alloy 442 of FIG. 7 may be supplied with a current of a Pulse Width Modulation (PWM) type. This will be described further with reference to FIG. 9. FIG. 9 is a block diagram illustrating a current supplier for supplying a current to an actuator according to an embodiment of the present disclosure.

The image display device 100 may further include a PWM generator 191 as a current supplier. The PWM generator 191 may generate PWM signals of two channels, i.e., a first PWM signal and a second PWM signal, according to a control signal received from the controller 170. The first PWM signal and the second PWM signal may be used to control the first shape memory alloy 441 and the second shape memory alloy 442, respectively.

Hereinafter, referring to FIG. 10, disposition of wires for supplying current to the first and second shape memory alloys 441 and 442 of FIG. 7 will be described. FIG. 10 shows first and second wires for supplying current to the first and second shape memory alloys of the actuator of FIG. 7, respectively. FIG. 10 (10-1) is a perspective diagram showing the first actuator module 400-1 viewed in one direction, and FIG. 10 (10-2) is a layout illustrating the first actuator module 400-1 viewed in the Y-direction.

Figure 10:
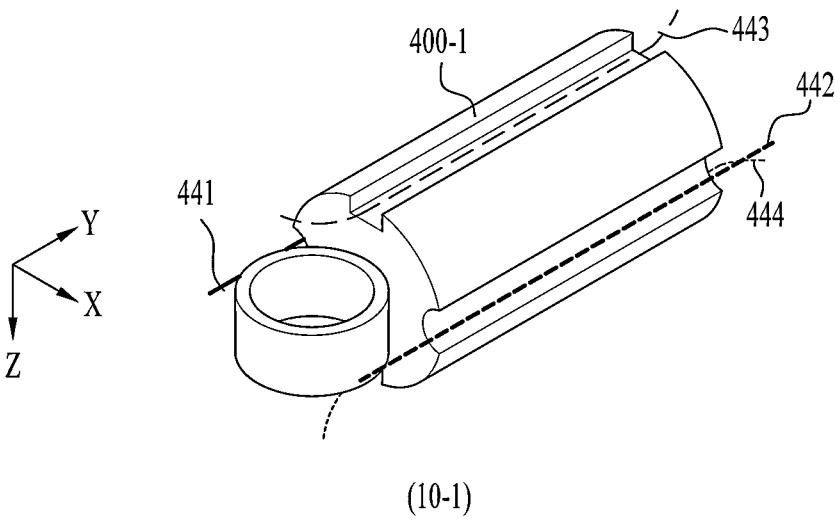
FIG. 10 is a diagram illustrating a first wiring and a second wiring for supplying current to a first shape memory alloy and a second shape memory alloy of the actuator of FIG. 7, respectively.
Figure 10:
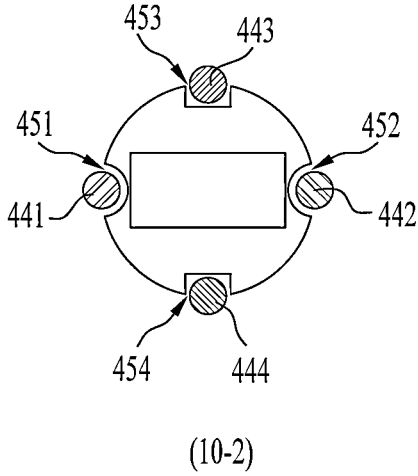

The actuator 400 may be configured in a manner that a plurality of first actuator modules 400-1 shown in FIG. 10 are coupled together.

A first groove 451 and a second groove 451 may be formed in the Y-direction (i.e., a length direction of the first actuator module) on both sides of the first actuator module 400-1 in the X-direction, and the first shape memory alloy 441 and the second shape memory alloy 442 may be seated in the first groove 451 and the second groove 451, respectively.

In addition, as shown in FIG. 10, a third groove 453 and a fourth groove 454 may be formed in the Y-direction (i.e., the length 1 direction of the first actuator module) on both sides of the first actuator module 400-1 in the Z-direction, and a first wiring 443 and a second wiring 444 may be seated in the third groove 453 and the fourth groove 454, respectively.

Figure 11:
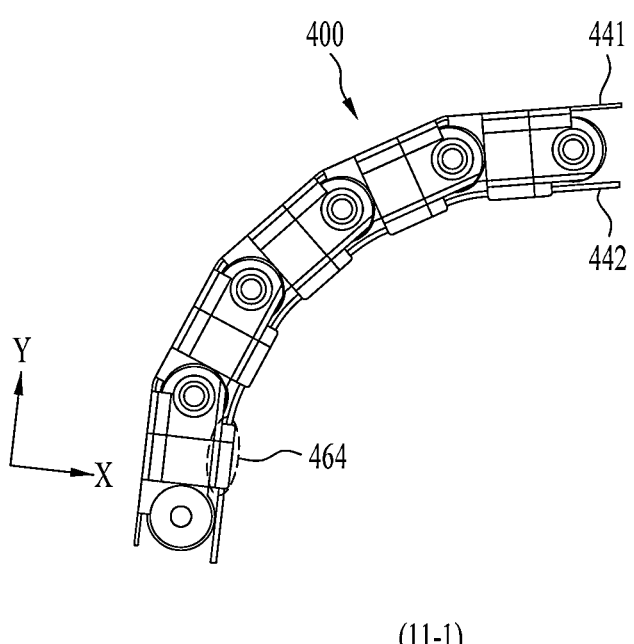
FIG. 11 is a diagram illustrating deformation of an actuator composed of a plurality of actuator modules of FIG. 10.
Figure 11:
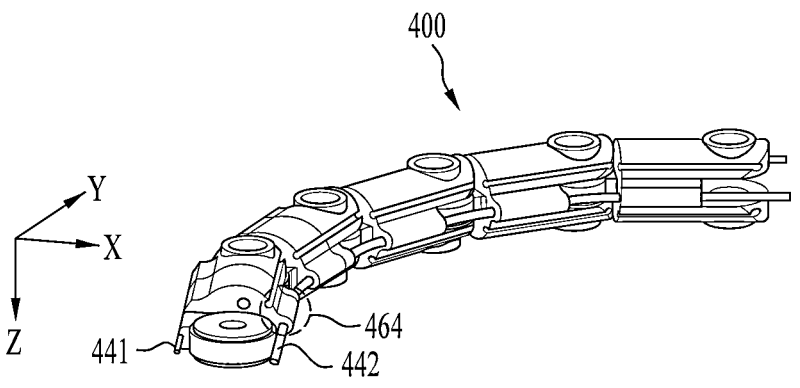

Hereinafter, the deformation of FIG. 10 will be described with reference to FIG. 11. FIG. 11 shows a deformation of an actuator composed of a plurality of actuator modules of FIG. 10. FIG. 11 (1-1) is a layout of the actuator viewed in the Z-direction, and FIG. 11 (11-2) is a perspective diagram showing the actuator viewed in one direction.

In FIG. 10, it is illustrated that the first to fourth grooves 451 to 454 are formed in the first actuator module 400-1, but the present disclosure is not limited thereto. For example, a pipe 464 may be formed instead of at least one of the first to fourth grooves 451 to 454, and the shape memory alloy or the wiring may be disposed in the pipe 464. In FIG. 11, it is illustrated that the pipe 464 is formed instead of the fourth groove 454.

Also, in FIG. 10, the first wiring 443 and the second wiring 444 are illustrated as being elongated along the first shape memory alloy 441 and the second shape memory alloy 442, but the present disclosure is not limited thereto. The first wiring 443 and the second wiring 444 are connected to end portions of the first shape memory alloy 441 and the second shape memory alloy 442, respectively, and thus the first wiring 443 and the second wiring 444 may not be visible from a middle portion of the actuator 400. That is, as shown in FIG. 11, the third groove 453 and the fourth groove 454 (or a replaced pipe) for the first wiring 443 and the second wiring 444 may not be visible from the first actuator module 400-1.

Figure 12:
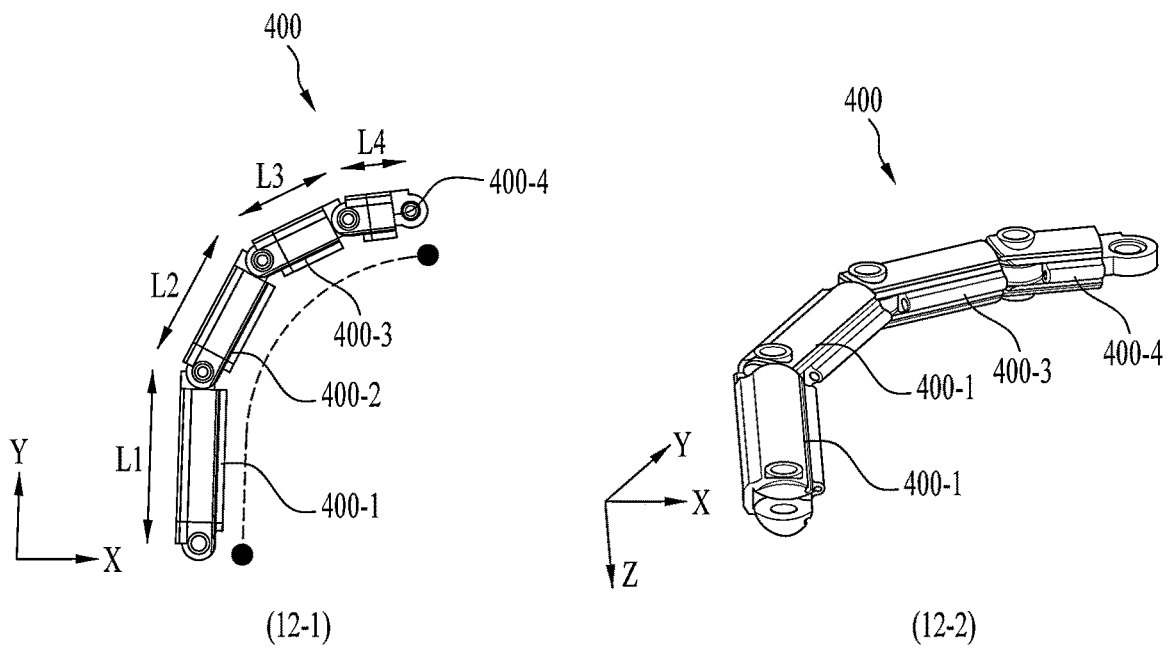
FIG. 12 is a diagram illustrating an actuator composed of a plurality of actuator modules having different individual lengths according to an embodiment of the present disclosure.

A curvature on bending the actuator 400 may be changed by adjusting a length of each actuator module in the actuator 400. This will be described further with reference to FIG. 12. FIG. 12 illustrates an actuator composed of a plurality of actuator modules having different individual lengths according to an embodiment of the present disclosure.

As shown in FIG. 12, the actuator 400 may include a plurality of actuator modules. In FIG. 12, the actuator 400 is illustrated as including four actuator modules: a first actuator module 400-1, a second actuator module 400-2, a third actuator module 400-3, and a fourth actuator module 400-4. It is a matter of course that the actuator 400 may include fewer or more actuator modules.

By adjusting the individual lengths of a plurality of the actuator modules, the curvature on bending the actuator 400 may be changed.

In FIG. 12, it is illustrated that a length L1 of the first actuator module 400-1>a length L2 of the second actuator module 400-2>a length L3 of the third actuator module 400-3>a length L4 of the fourth actuator module 400-4.

Thus, when the actuator 400 is bent, a curvature of one end in the direction of the first actuator module 400-1 may be small and a curvature of the other end in the direction of the fourth actuator module 400-4 may be large.

Figure 13:
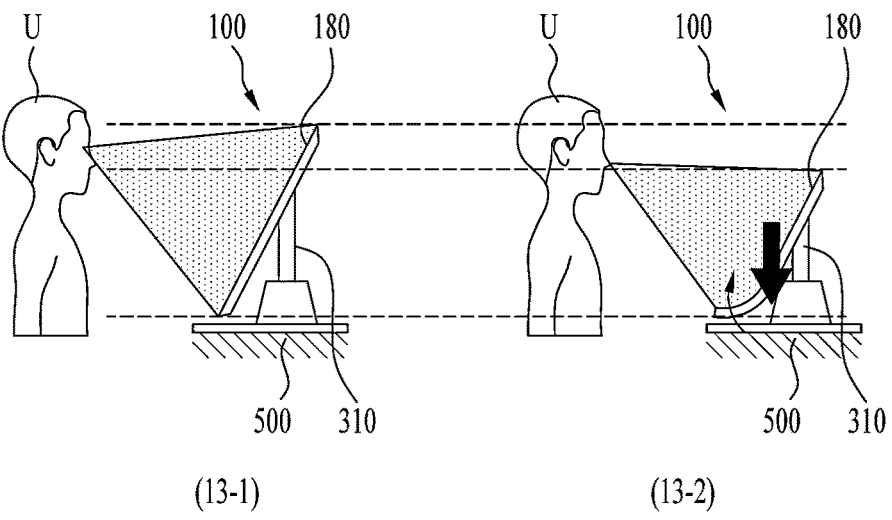
FIG. 13 and FIG. 14 are diagrams illustrating a utilization example of an image display device according to an embodiment of the present disclosure.

Hereinafter, an example of the use of an image display device 100 including a flexible display panel 180 that is automatically bendable by having the actuator 400 will be described with reference to FIG. 13. FIG. 13 shows an example of the use of an image display device according to an embodiment of the present disclosure. In FIG. 13, it is assumed that the actuator 400 is disposed at a lower end portion of a rear surface of the flexible display 180 as shown in FIG. 2 (2-1) and FIG. 2 (2-2).

As shown in FIG. 13 (13-1), the image display device 100 may be placed on the table 500 (or desk, floor, etc.) through the stand 310.

By adjusting the extension length of the stand 310, the height of the display panel 180 of the image display device 100 may be adjusted vertically to suit the gaze of the user U.

The extension length of the stand 310 may be manually adjusted by the user U.

Alternatively, since the stand 310 includes a length adjuster (not shown) driven by electricity, the extension length of the stand 310 may be automatically adjusted. The length adjuster may be controlled by the controller 170. For example, when the user U inputs a prescribed command through the remote controller 200, the controller 170 of the image display device 100 may adjust the extension length of the stand 310 by vertically increasing or decreasing the length of the length adjuster in response to the prescribed command.

The stand 310 may further include a sensor (not shown) for measuring the extension length of the stand, and the sensor may transmit the extension length of the stand to the controller 170.

When the extension length of the stand 310 is less than or equal to a predetermined length, as shown in FIG. 13 (13-2), the controller 170 may control the flexible display 180 to be bent automatically so as not to touch the table 500 by controlling the actuator 400 to be bent. As described above, the control of the actuator 400 may be performed through the PWM generator 191.

A bending extent (i.e., curvature) of the actuator 410 may be set inversely proportional to the extension length of the stand 310.

On the other hand, when the extension length of the stand 310 becomes greater than or equal to the predetermined length, the controller 170 may control the flexible display 180 to be automatically stretched d by controlling the actuator 400 to be stretched.

Figure 14:
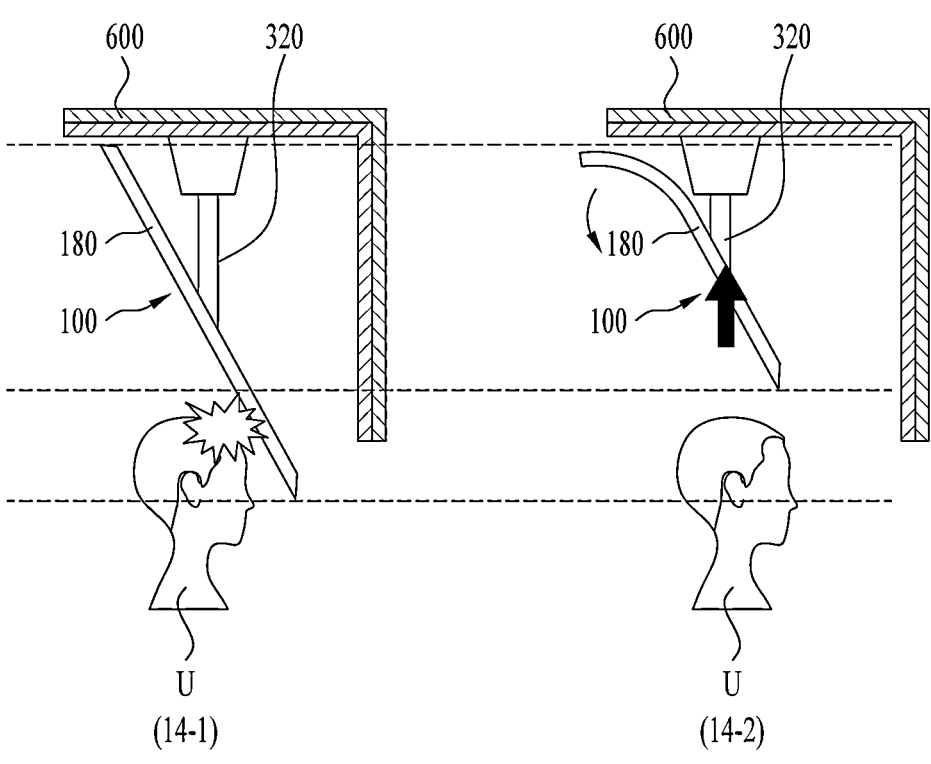

Hereinafter, another application example of an image display device 100 including a flexible display panel 180 that is automatically bendable by being provided with the actuator 400 will be described with reference to FIG. 14. FIG. 14 shows an application example of an image display device according to an embodiment of the present disclosure. In FIG. 14, it is assumed that the actuator 400 is disposed at an upper end portion of a rear surface of the flexible display 180 as shown in FIG. 2 (2-3).

As shown in FIG. 14 (14-1), the image display device 100 may be mounted on a ceiling 600 through a ceiling holder 320.

By adjusting an extension length of the ceiling holder 320, a height of the display panel 180 of the image display device 100 may be adjusted vertically to fit a gaze of a user U or to prevent a body (e.g., head) of the user U during daily life from touching lower end portion of the display panel 180 of the image display device 100.

The extension length of the ceiling holder 320 may be manually adjusted by the user U.

Alternatively, since the ceiling holder 320 includes a length adjuster (not shown) driven by electricity, the extension length of the ceiling holder 320 may be automatically adjusted. The length adjuster may be controlled by the controller 170. For example, when the user U inputs a prescribed command through the remote controller 200, the controller 170 of the image display device 100 may adjust the extension length of the ceiling holder 320 by vertically extending or decreasing the length of the length adjuster in response to the prescribed command.

The ceiling holder 320 may further include a sensor (not shown) for measuring the extension length of the ceiling holder 320, and the sensor may transmit the extension length of the ceiling holder 320 to the controller 170).

When the extension length of the ceiling holder 320 becomes equal to or smaller than a predetermined length, the controller 170 may control the actuator 400 to be bent so that an upper end portion of the flexible display 180 does not touch the ceiling 600 by controlling the actuator 400 to be bent, as shown in FIG. 14 (14-2). As described above, the control of the actuator 400 may be performed through the PWM generator 191.

A bending extent (i.e., curvature) of the actuator 410 may be set to be inversely proportional to an extension length of the ceiling holder 320.

On the other hand, when the extension length of the ceiling holder 320 becomes greater than or equal to the predetermined length, the controller 170 may control the flexible display 180 to be automatically unfolded by controlling the actuator 400 to be unfolded.

In FIG. 14, it is described that the length of the length adjuster is increased or decreased vertically through an input of a prescribed command through the remote controller 200. Yet, the present disclosure is not limited thereto.

For example, a human body detection sensor (not shown) for sensing a presence of a user may be provided on a front and/or rear surface of the image display device 100.

The human body detection sensor may include a camera for inputting an image signal. The camera may process an image frame of a still image or a moving image obtained by an image sensor, and may sense a human body in the processed image frame.

Alternatively, the human body detection sensor may be provided with another low-cost sensor for human body detection instead of the camera or together with the camera. A representative example of the low-cost sensor is a Passive Infrared (PIR) sensor. Since the PIR sensor may be operated for a long period of time without external power with very little current consumption and may be manufactured in a small size, it has the advantage of being able to operate for more than one year without special maintenance and easy waterproof spinning design. It is a matter of course that another sensor, such as an ultrasonic sensor, may be used instead of the PIR sensor.

When it is detected that a human body (e.g., the user) is within a predetermined distance from the image display device 100 through the human body detection sensor, the controller 170 may control the length of the length adjuster to be within a predetermined length. If it is not detected that a human body is within the predetermined distance, the controller 170 may control the length of the length adjuster to be more than the predetermined length.

As described above, a curvature of the flexible display 180 may change depending on the length of the length adjuster.

Meanwhile, it is described that the actuator 400 is provided to cover only the upper end portion or the lower end portion of the flexible display 180. However, the present disclosure is not limited thereto. The actuator 400 may be provided to cover the entire upper and lower portions of the flexible display 180.

Various aspects may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the display device and the controller 280 of the remote controller. The foregoing aspects are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary aspects described herein may be combined in various ways to obtain additional and/or alternative exemplary aspects.

What is claimed is:

1. An image display device, comprising:
   a flexible display panel;
   an actuator mounted on a rear surface of the flexible display panel to bend at least a portion of the flexible display panel and having a first shape memory alloy and a second shape memory alloy;
   a current supplier for individually supplying current to the first shape memory alloy and the second shape memory alloy; and
   a controller for controlling an operation of the current supplier,
   wherein the actuator comprises a plurality of actuator modules sequentially fastened in a length direction, and
   wherein a plurality of the actuator modules comprise at least a first actuator module and a second actuator module and wherein each of the first actuator module and the second actuator module comprises a first fastening part at one end of the length direction and a second fastening part at the other end thereof.

2. The image display device of claim 1, wherein a friction material is interposed between the first fastening part and the second fastening part to provide a frictional force of a prescribed magnitude on rotation based on rotatably coupling the first fastening part of the first actuator module and the second fastening part of the second actuator module together.

3. The image display device of claim 2, wherein the frictional force is smaller than a restoring torque of the first shape memory alloy and the second shape memory alloy and greater than elasticity of the flexible display panel.

4. The image display device of claim 1, wherein the first shape memory alloy and the second shape memory alloy have a linear shape and a curved shape at a predetermined temperature or higher, respectively, and wherein the first shape memory alloy and the second shape memory alloy have a curved shape and a linear shape at a temperature below the predetermined temperature, respectively.

5. The image display device of claim 4, wherein the first shape memory alloy is disposed along a length direction of the actuator on one side in a thickness direction of the actuator, and wherein the second shape memory alloy is disposed along the length direction of the actuator on the other side in the thickness direction of the actuator.

6. The image display device of claim 1, wherein the actuator is mounted on a lower or upper end portion of a rear surface of the flexible display panel in a vertical direction, wherein the image display device further comprises a stand for supporting the image display device on a ground or a ceiling holder for mounting the image display device on a ceiling, and wherein the stand or the ceiling holder comprises a sensor for measuring a length of the stand or the ceiling holder.

7. The image display device of claim 6, wherein the controller controls to determine whether to bend the flexible display panel depending on the length of the stand or the ceiling holder.

8. The image display device of claim 7, wherein the controller controls the flexible display panel to be bent when the length of the stand or the ceiling holder becomes equal to or smaller than a predetermined length.

9. The image display device of claim 8, wherein the controller controls a curvature of the flexible display panel to be inversely proportional to the length of the stand or the ceiling holder.

\* \* \* \* \*